United States Patent [19]
Frehling

[11] 3,903,527
[45] Sept. 2, 1975

[54] METHOD OF PHOTOGRAPHIC TRACING AND A PROJECTOR FOR THE APPLICATION OF SAID METHOD

[75] Inventor: André Frehling, Maisons-Alfort, France

[73] Assignee: Etablissements Rollet & Cie, Siene, France

[22] Filed: Apr. 15, 1974

[21] Appl. No.: 461,129

[30] Foreign Application Priority Data
Apr. 19, 1973 France .............................. 73.14301

[52] U.S. Cl. ............................................ 354/4; 354/4
[51] Int. Cl.² ........................................... G03B 41/00
[58] Field of Search ........................................ 354/4

[56] References Cited
UNITED STATES PATENTS
3,797,935  3/1974  Marcy .................................. 354/4

*Primary Examiner*—John M. Horan
*Attorney, Agent, or Firm*—Young & Thompson

[57] ABSTRACT

Continuous lines having substantially parallel edges and a substantially constant exposure at any point of the line irrespective of its width are traced automatically by successive spots applied at high frequency on a photosensitive surface by means of a projector which is continuously movable in a direction parallel to the surface. Light pulses whose duration, frequency and amplitude are at each instant a function of the unitary relative displacement of the projector are modulated with reference to a predetermined value of the displacement and of the width of the line in order that the successive images of the spot corresponding to the pulses should overlap to a sufficient extent to ensure that the resultant image is that of a line which has substantially rectilineal edges and is the envelope of the images of the spot and in order that the exposure should be substantially constant over the entire length of the line and over all the lines traced regardless of the respective widths of the lines.

19 Claims, 13 Drawing Figures

Fig. 8
Fig. 9
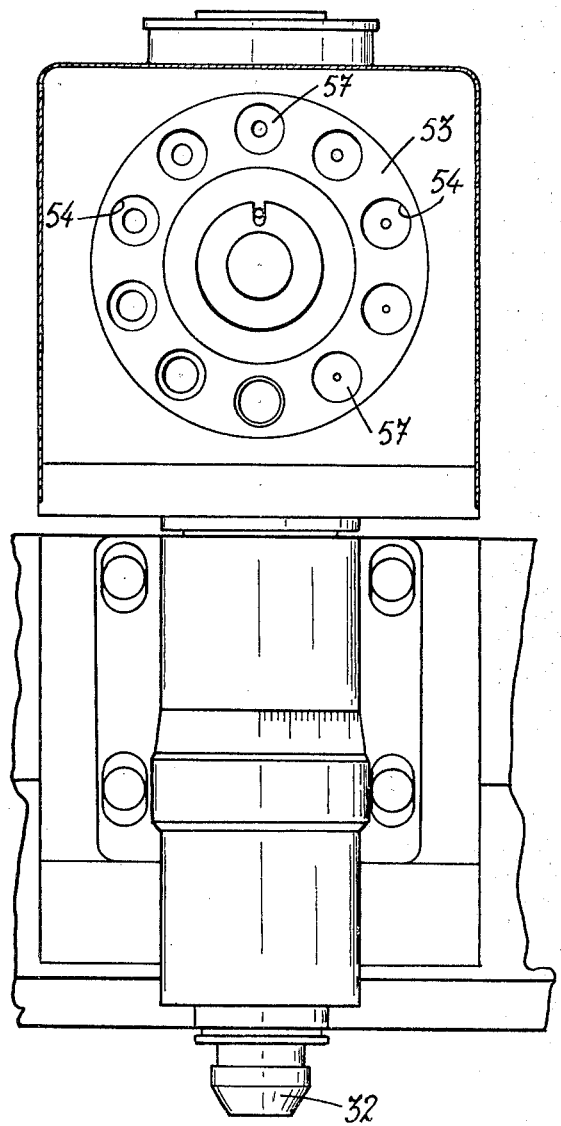
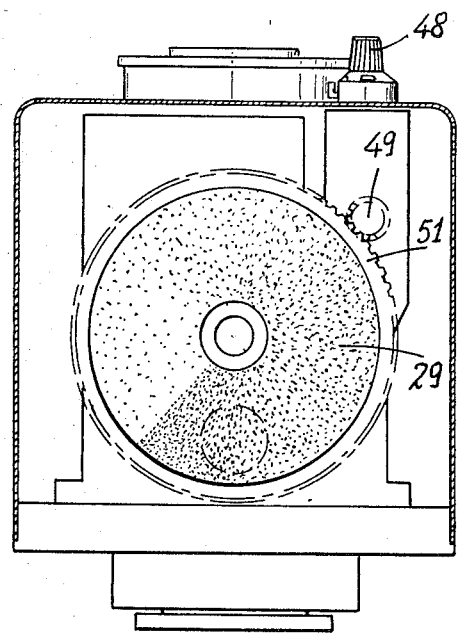

3,903,527

METHOD OF PHOTOGRAPHIC TRACING AND A PROJECTOR FOR THE APPLICATION OF SAID METHOD

This invention relates to a method of automatic photographic tracing, to a light projector for the application of said method and to a machine on which the projector is mounted in order to carry out the automatic displacement of this latter.

It is known that this type of machine makes it possible to perform automatic tracing of a document on a photosensitive surface such as a photographic film by means of information stored on punched tape. A reproducible document of this type is employed in particular in the fabrication of printed circuits.

A photographic tracing machine comprises a light projector mounted on a moving carriage which is controlled in dependence on stored information and capable of causing the projector to move in a direction parallel to a plane on which the photosensitive surface is applied.

It is apparent that the only movements to be considered are the relative movements of the projector with respect to the sensitive surface, either of these two elements being stationary whilst the other is movable or both elements being capable of motion.

Said projector produces a light spot, the intensity of which must vary as a function of the dimensions of said spot. The product of said intensity and of the exposure time must also be substantially constant in order to obtain on the photographic document a trace of the lines which has a uniform density and a well-defined width.

Machines are known in which the intensity of the spot is caused to vary as a function of its velocity by making use of filters having a coefficient of transmission or density which varies from one point of the filter to another and by controlling the positions of such filters with respect to the light beam within the projector as a function of the rate of displacement of the projector. However, the manufacture of filters of this type is difficult and not readily reproducible and it is also necessary to provide mechanisms for positioning said filters which are necessarily subject to play and inertia, thereby impairing the accuracy of the result. These mechanisms are also subject to wear and call for a certain amount of maintenance.

One of the aims of the present invention is to describe a method of tracing which makes it possible to overcome the disadvantages mentioned in the foregoing.

In the method according to the invention, continuous lines having substantially parallel edges and a substantially constant exposure at any point of the line irrespective of the width of said line are traced automatically by successive spots applied at high frequency on a photosensitive surface, the exposure aforesaid being understood to designate the product of the luminous intensity received at one point and of the total time of exposure of said point, and use is made of a projector which is continuously movable in a direction parallel to the sensitive surface aforesaid. The method essentially consists in modulating light pulses whose duration, frequency and amplitude are at each instant a function of the unitary displacement of the projector with reference to a predetermined value of said displacement and of the width of the line in order that the successive images of the spot corresponding to said pulses should overlap to a sufficient extent to ensure that the resultant image is that of a line which has substantially rectilineal edges and is the envelope of the images of the spot and in order that the exposure aforesaid should be substantially constant over the entire length of the line and over all the lines traced irrespective of the respective widths of said lines.

A further aim of the present invention is to describe a projector for a photographic tracing machine which is intended especially to permit the practical application of the method aforesaid.

In accordance with the invention, the light projector for a photographic tracing machine which is primarily intended to carry out the automatic tracing of conductive strips of printed circuits by application of the method aforementioned, said machine being provided with a device for causing the continuous movement of the projector in a direction parallel to a plane on which a photosensitive surface is applied, comprises an object-holder, a light source for illuminating an object in the form of a substantially circular or square spot mounted in said object-holder, an optical system for forming the image of said spot on the photosensitive surface and an optical transducer such as an electro-optical transducer or an acousto-optical transducer for modulating at high frequency the luminous intensity received by the object-spot, said light projector being characterized in that it comprises:

a. a generator for producing successive trigger signals;

b. means for causing said signals to initiate a corresponding sequence of light pulses which are applied to the object-spot;

c. and means for initiating the application of the trigger signals aforesaid as a function of the unitary displacements of the projector in such a manner as to ensure that two successive images of the spot which are thus obtained overlap over the greater part of their surfaces.

In one advantageous embodiment of the invention, the optical transducer is of the electro-optical type and comprises a birefringent plate controlled by the trigger signals aforesaid.

In another advantageous embodiment of the invention, the light source is a laser beam generator and the optical transducer is of the acousto-optical type.

Further properties of the invention will be brought out by the following description, reference being made to the accompanying drawings which are given by way of example without any limitation being implied, and in which:

FIG. 8 is a front view of the projector of FIG. 7;

FIG. 9 is a sectional view taken along line IX—IX of FIG. 7;

FIG. 10 is an optical diagram of the projector shown in FIGS. 7 to 9;

The method in accordance with the invention consists in relating the three parameters employed, namely amplitude, time-duration and frequency of the light pulses, with three variables which are the width of the line and of the two coordinates which define the unitary displacement of the projector.

As the diameter of the spot is larger, so a given point of the line will be subjected to a greater number of overlaps. In order to maintain the same exposure irrespective of the width of the line, it is therefore preferable to vary the exposure as an inverse function of the line width.

In addition, as the unitary displacement of the projector is of higher value, so the overlap is smaller and the total time of exposure of a given point is accordingly of shorter duration. In order to maintain constant the product of said total time and of the intensity, it is preferable to produce action on two out of three of the parameters aforementioned, as a function of two geometrical variables which, by way of example, can be a cartesian component of the displacement and the angle made by the real displacement with said component.

A clearer understanding of the performance of said method will be gained from a perusal of the following description of the projector and of its operation.

Figure 1:
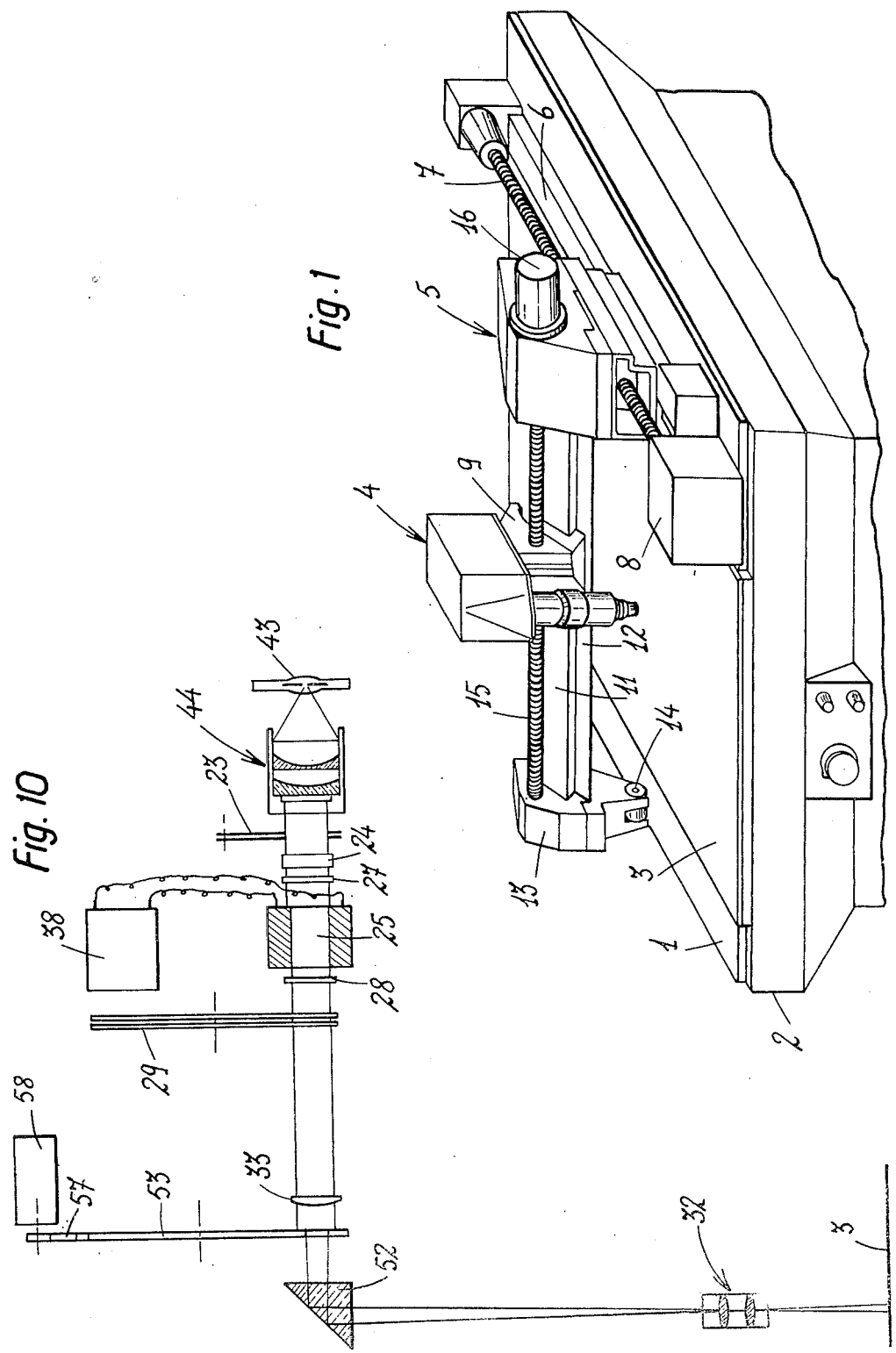
FIG. 1 is a perspective view of a photographic tracing machine comprising a projector in accordance with the invention.

The photographic tracing machine which is illustrated in FIG. 1 essentially comprises a plane table 1 supported by a frame 2 and constituting the horizontal reference plane of the machine. Said plane table supports a rectangular plate 3 on which a photosensitive support to be exposed (not shown) is applied during operation. Said support is maintained on the plate by known means which do not form part of the present invention.

A light projector 4 is mounted on a mechanism which permits displacement of said projector in a direction parallel to the plane of the plate 3. Said mechanism comprises a first carriage 5 which is guided by a rail 6 and this latter permits a rectilineal movement of displacement of said carriage in a direction which will be designated hereinafter as the "X direction" or "X-axis" and which is parallel to one of the sides of the plate 3. The carriage 5 is displaced by means of a lead-screw 7 which is driven by a stepping motor 8.

The projector 4 is supported by a second carriage 9 guided by a rail 11 which is supported by a cross-beam 12 located at right angles to the rail 6 which serves to guide the first carriage. Said cross-beam 12 is secured at one end to the first carriage 5 and at the other end to a support 13 which runs along the plane table 1 by means of a roller 14.

The second carriage 9 is capable of moving along the rail 11 by means of a lead-screw 15 which is driven in rotation by a stepping motor 16. The direction of motion of the carriage 9 will be designated hereinafter as the "Y direction" or "Y-axis".

The movement of rotation of the two motors 8 and 16 is controlled in a manner which is known per se by means of data which are stored, for example, on a punched tape within a programmer.

Figure 2:
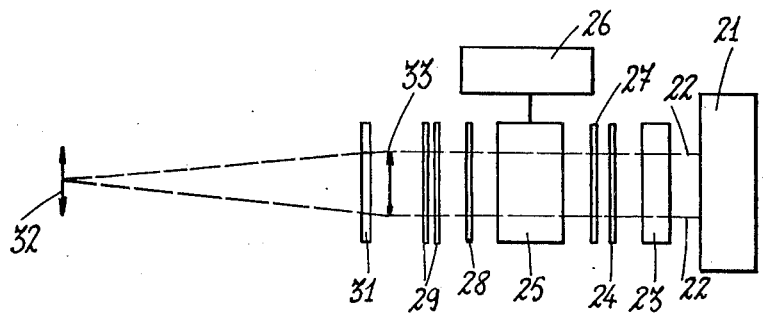
FIG. 2 is a schematic diagram of a first embodiment of a projector comprising an electrically birefringent plate in accordance with the invention.

The general diagram of FIG. 2 shows the essential components of a projector 4 in accordance with the invention.

Said projector comprises a light source 21 arranged so as to produce a light beam which is as parallel as possible and shown diagrammatically at 22. By way of example, said source can be an arc lamp with a mercury vapor atmosphere followed by a condensing lens unit, or a laser which emits a parallel beam having a wavelength corresponding to the sensitive range of photographic emulsions.

A mechanical shutter 23 is interposed on the path of the beam 22 at the exit of the source 21 so as to cut-off the beam during the relatively long inoperative periods of the machine. Said shutter is of a type known per se and comprises, for example, two oppositely-acting roller blinds which can be controlled by an electromagnet.

The shutter 23 is followed by a filter 24 which is mainly intended to remove the long wavelengths corresponding to the red and infrared region. This filter can also remove short wavelengths below that of the violent region in order to avoid certain difficulties presented in this field by the polarizer and analyzer which will be mentioned hereinafter.

A system which has the intended function of modulating the intensity of the beam 22 is placed after the filter 24 and constitutes the essential feature of the invention.

In the form of construction shown in the drawings, said system comprises a plate cut in an electro-optical crystal which possesses electrical birefringence. By way of example, said crystal consists of potassium dihydrogen phosphate or ammonium dihydrogen phosphate which is commonly designated by the abbreviation KDP or ADP respectively and in which the birefringence is a function of an electric field applied to the crystal. Said electric field is produced by a generator 26 which will be described in detail hereinafter.

The birefringent plate 25 is placed between a polarizer 27 and an analyzer 28 which are in crossed relation, that is to say in which the respective directions of polarization are relatively displaced by 90 degrees. The directions of polarization of the polarizer and of the analyzer are preferably disposed at ! 45 degrees with respect to the neutral lines of the birefringent plate, which is known to correspond to the condition of maximum transmission. It is also known that, in practice, a system of this type allows light to pass through only if birefringence is in fact exhibited, that is to say if an electrical signal is applied to the plate 25 by the generator 26.

The system for modulating luminous intensity is followed by a manually operated attenuator 29 which is intended to adjust the luminous intensity as a function of the sensitivity of the photosensitive surface employed. Said attenuator must be capable of uniform absorption over a large surface and can consist, for example, of a double wedge of the Goldberg type.

The projector further comprises in a manner known per se an object-holder 31 for receiving an object whose image is to be formed on the photosensitive surface by means of an object-lens 32, and a convergent optical system 33, the design function of which is to focus the parallel beam 22 onto the lens 32.

Figure 3:
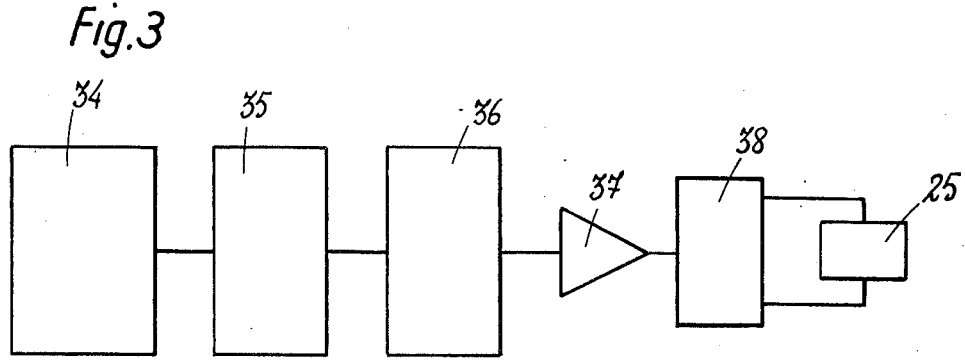
FIG. 3 is a general schematic diagram of the generator for controlling the birefringence.

The main components of the birefringence control generator 26 are shown in the diagram of FIG. 3.

A generator 34 produces periodic signals having a substantially constant amplitude and a frequency at least equal to 10 kc/s. These signals are preferably sinusoidal but can also have a rectangular waveform. Said generator is connected to a device 35 for varying the amplitude of the periodic signals as a function of the dimensions of the object whose image is to be formed. In the application to the manufacture of printed circuits, the object is constituted in the majority of cases by a removable diaphragm in which the diameter of the aperture is a function of the width of the line to be formed on the sensitive surface. The device 35 accordingly makes it possible to modify the amplitude of the signals emitted by the generator 34 as a function of the diaphragm which is employed.

Figure 4:
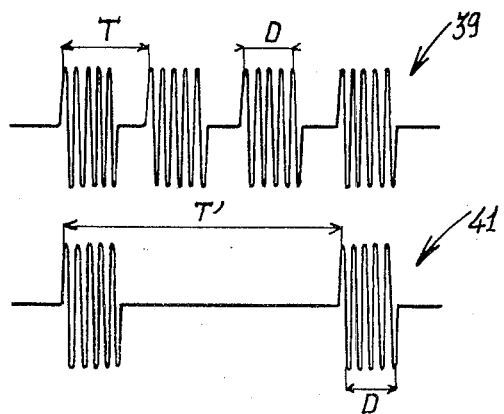
FIG. 4 shows the wave trains produced by the generator of FIG. 3.

The output of the device 35 is connected to the modulator 36 proper which will be described in detail hereinafter and the function of which is to convert the periodic and continuous signals of the generator 34 into a series of wave trains spaced in time as shown in FIG. 4. The modulator 36 makes it possible in particular to vary the interval T between successive wave trains and the duration D of each wave train as will become apparent hereinafter.

There can next be seen a power amplifier 37 and a step-up transformer 38 which applies the wave trains of FIG. 4 to the birefringent plate 25 at a high voltage. In order to prevent any stray capacitance effect, said transformer 38 is mounted as close as possible to the plate 25. It is apparent that the transformer will be easier to construct and will in particular be of smaller overall size if the signals of the generator 34 are sinewave signals since the pass-band of said transformer is consequently much smaller than would be the case if these signals had a rectangular waveform.

The modulator 36 is designed to vary the interval T between wave trains and the duration D of each wave train (shown in FIG. 4) as a function of the displacement carried out with respect to the sensitive surface of the luminous spot formed by the projector. In more exact terms, the modulator initiates a wave train and consequently causes the emission of a light flash each time the component of displacement of the projector in a reference direction attains a predetermined unitary value d. The duration D of the wave train and of the emitted flash is adjusted as a function of the angle between the direction of displacement of the projector and said reference direction.

In practice, the reference direction aforesaid is one of the X or Y axes defined earlier. In the form of construction which will now be described, the modulator 36 comprises means for determining the particular axis along which the component of displacement of the projector has the highest value and for selecting said axis as a reference direction.

Figure 5:
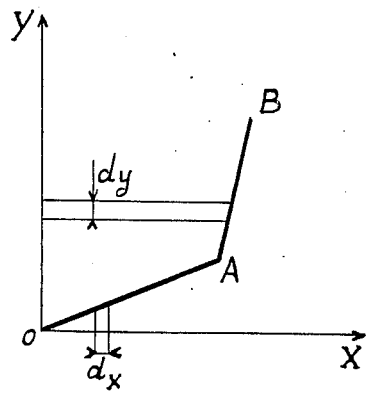
FIG. 5 is a diagram showing the components of displacement of the projector.

For example, if the projector follows a path OAB (as shown in FIG. 5), the reference direction will be the X-axis in the case of the portion OA of the path and then the Y-axis in the case of the portion AB.

There are shown in FIG. 4 two forms of modulated signals corresponding to movements in the same direction but performed at different speeds. The time interval between successive wave trains corresponds in both cases to a unitary displacement in the reference direction. The interval T of the waveform 39 which corresponds to a high speed of displacement is therefore shorter than the interval T: of the waveform 41 which corresponds to a lower speed. The duration D is the same in both cases since the direction of displacement is the same.

Figure 7:
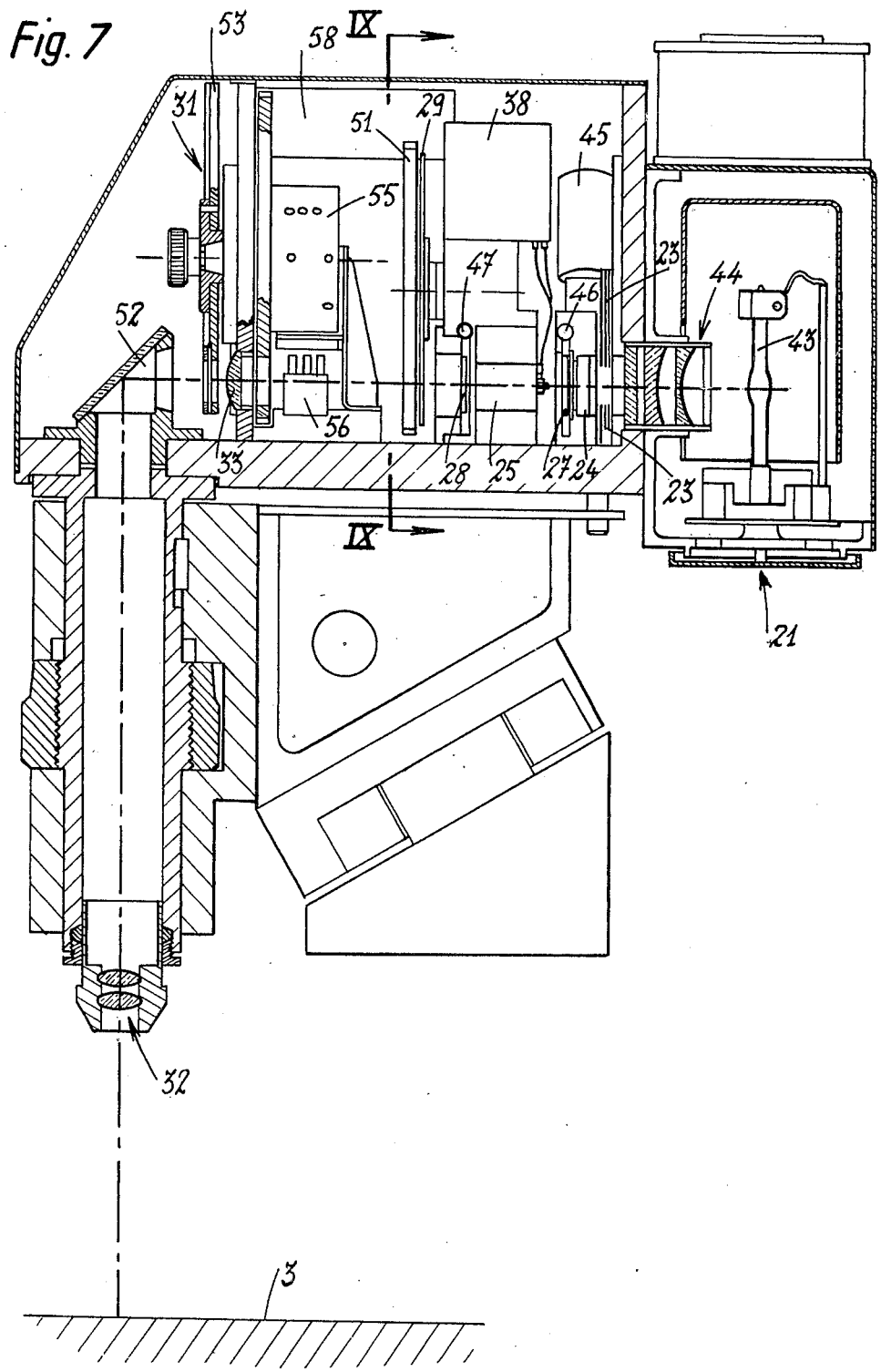
FIG. 7 is a sectional view in elevation showing an industrial embodiment of a projector in accordance with the invention.

FIGS. 7 to 9 illustrate the arrangement of the elements shown in the diagrams of FIGS. 2 and 3 in an industrial embodiment of the projector 4. The optical diagram of this embodiment is illustrated in FIG. 10.

In this embodiment, the light source 21 comprises an arc lamp 43 and a condensing lens unit 44 for making the light beam parallel. The mechanical shutter 23 is shown together with its control electromagnet 45.

There is again shown after the filter 24 the birefringent crystal 25 which is mounted between the polarizer 27 and the analyzer 28. Angular adjustment devices 46 and 47 are provided for these latter. The high-voltage transformer 38 is mounted in the proximity of the crystal 25.

The attenuator 29 for adjusting the luminous intensity as a function of the sensitivity of the photosensitive surface is constituted in this case by a rotary filter having variable opacity (FIGS. 8 and 9), the position of which can be adjusted by means of a manual control knob 48 which serves to rotate said filter by means of a pinion 49 and a toothed wheel 51 which is rotationally coupled to said filter.

The convergent lens 33 (shown in FIGS. 7 and 10) focuses the parallel light beam onto the object-lens 32. A rectangular prism 52 is placed on the path of the convergent beam in order to direct the emergent beam at right angles to the plane of the plate 3.

The object-holder 31 is constituted by a rotary disc 53 provided with a series of recesses 54 (shown in FIG. 8) which are adapted to accommodate the diaphragms 57 with apertures of different diameters. The position of the disc 53 is controlled by a motor 58 in dependence on data which are stored, for example, in a punched tape and decoded by means of a device 55.

Additional filters can be interposed by means of a slide unit 56.

Figure 6:
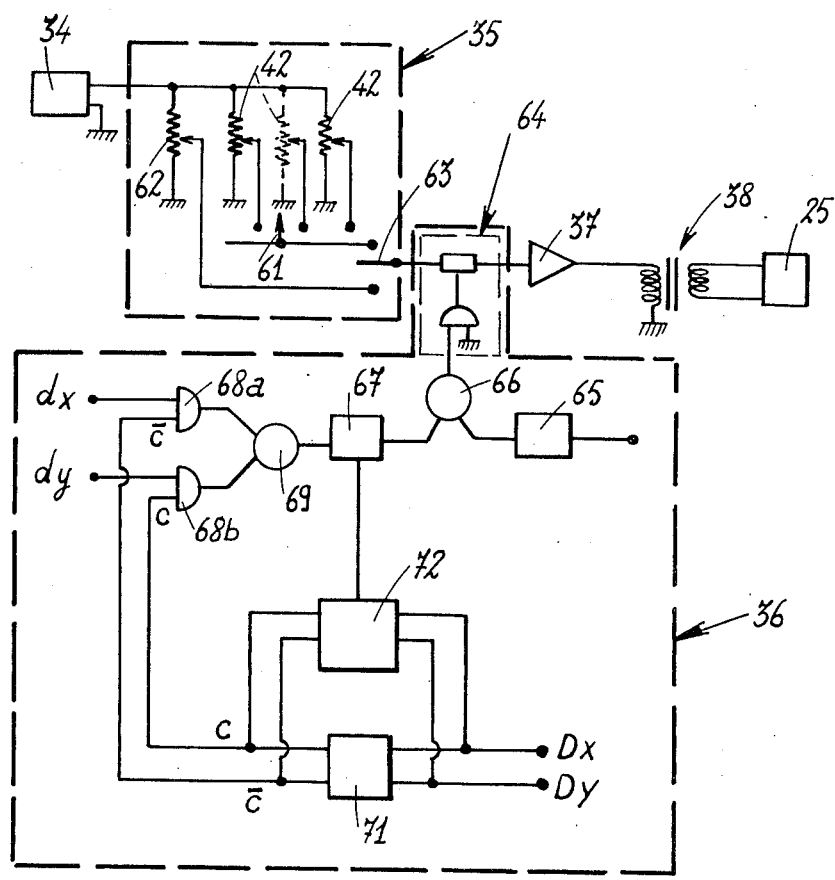
FIG. 6 is a diagram of the generator of FIG. 3.

Referring to FIG. 6, the regulating device 35 and the modulator 36 will now be described in detail.

The device 35 comprises a series of potentiometers 42 which are equal in number to the number of recesses 54 of the object-holder disc 53 shown in FIG. 8. A selector 61 which is driven in synchronism with the motor 58 selects the particular potentiometer which corresponds to the diaphragm 57 employed.

Another potentiometer 62 which is independent of the series aforesaid is primarily intended for use in the fabrication of printed circuits. This potentiometer is put into service when it is desired to form the connecting points, often referred-to as pellets, of the components to be mounted on a printed circuit. A switch 63 makes it possible to put into service either the potentiometer 62 or one of the potentiometers 42, depending on whether it is desired to form pellets or lines. The potentiometer 62 may clearly be employed for the purpose of forming any symbols in applications other than the fabrication of printed circuits.

The switch 63 is connected to the power amplifier 37 via an analog AND-gate 64, the opening of which is controlled by the modulator.

In the case of formation of pellets or symbols in which the projector is motionless, the gate 64 is controlled by a monostable circuit 65 through an OR-gate 66. Under these conditions, the gate 64 transmits the signals which are produced by the generator 34 and the amplitude of which is determined by the potentiometer 62 during a time interval equal to the transition or delay time of the monostable circuit 65.

In order to form lines, the gate 64 is controlled through the OR-gate 66 by a second monostable delay circuit 67 which has a variable transition time.

The monostable circuit 67 is triggered by signals which are emitted each time the projector has travelled over a distance equal to the unitary displacement $d$ in the reference direction. It has already been stated that this reference direction can be either the X-axis or the Y-axis. The signals which trigger the monostable circuit 67 are therefore emitted when the projector has travelled either over a unitary distance $dx$ (as shown in FIG. 5) or over a unitary distance $dy$ according as the largest component of displacement of the projector is directed along the X-axis or the Y-axis. The axis corresponding to the largest component aforesaid will be designated hereinafter as the "fast axis". It is readily apparent that $dx$ and $dy$ are both equal to $d$ at absolute value.

Said unitary signals $dx$ and $dy$ to trigger the monostable circuit 67 via the AND-gates 68a and 68b and an OR-gate 69.

In order to determine which axis is the fast axis, the modulator also receives from the programmer of the tracing machine signals Dx and Dy which correspond to the components along the X and Y axes of the movement of displacement to be carried out by the projector. Said signals are applied to a comparator 71 which emits a logical signal $c$ or its complement $c$ according as Dx is either smaller or greater than Dy. Said logical signals initiate respectively the opening of the AND-gate 68a or the opening of the AND-gate 68b.

The signals Dx and Dy are also applied to a computing stage 72 which is known per se and determines the absolute value of the displacement to be carried out by the projector and the angle $a$ between the direction of said displacement and the fast axis. To this end, the stage 72 also receives the logical signals $c$ and $c$.

The output signal of the computer 72 is inversely proportional to cos $a$ and is applied to the monostable circuit 67 in order to determine the transition time or delay time T of this latter.

Under these conditions, the frequency of the light pulses is proportional to the greater of the two components $dx$ and $dy$ and the duration of said pulses is longer as the direction of the line is more distant from the direction of said component. Since it has been noted that, in addition, the amplitude of the pulses varies with the width of the line, it is apparent that there is thus complete fulfilment of the condition in which the product of the luminous intensity received by each point to be exposed and the exposure time must remain substantially constant.

The result obtained is therefore in accordance with the ultimate objective of the invention, at least under normal operating conditions. Under such conditions, the rate of displacement of the projector in fact calls for a pulse frequency which is of sufficiently high value to obtain a satisfactory outline. However, when the projector starts from a position of rest or when it is necessary to trace certain particular configurations, it may happen that the movement of the projector takes place in a transient manner at a low speed such that the resultant drop in pulse frequency increases the importance attached to the quality of the extinction produced by the optical transducer. However, in the case of an electro-optical transducer of the birefringent plate type, this extinction is not perfect and the residual light which passes through the plate impairs the effect of contrast of the image obtained.

It is therefore found necessary to make use of a projector of the type which is described with reference to FIGS. 11 and 12.

Figure 11:
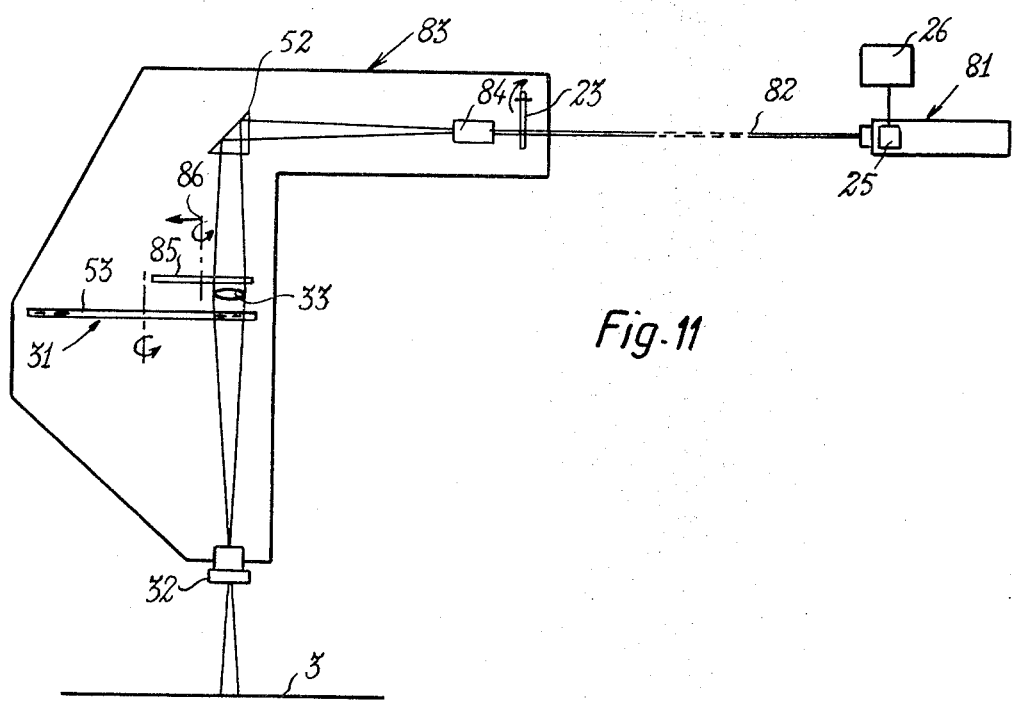
FIG. 11 is a diagrammatic view of a second embodiment of a projector in accordance with the invention and comprising a laser beam generator.

As shown in FIG. 11, a laser generator 81 comprises an acousto-optical transducer 25 which is incorporated in said generator and located between the mirrors of this latter. One example of a system of this type which is commercially available is constructed in the United States by the Liconix Company.

The transducer 25 is controlled electrically by a device 26 which permits the emission of a pulse-modulated coherent light beam 82 towards an optical system 83. Said device 26 is slightly different from the corresponding device described earlier and will accordingly be described below.

The optical system 83 comprises, in the direction of the light path, a manual shutter 23 having a stationary period of long duration, a divergent lens system 84, a right-angle prism 52, and a translucent disc 85 disposed transversely to the light beam; said disc can be actuated in rotation about an axis 86 which is displaced off-center with respect to the light beam by known means (not shown). Other known means are provided for withdrawing the disc 85 at will.

The optical system 83 additionally comprises the following elements which are not appreciably different from the corresponding elements of the embodiments described earlier: a convergent lens 33, an object-holder 31 comprising a disc 53 which can be actuated in rotation by means such as those described in the foregoing and carrying object-diaphragms of different diameters, and an object-lens 32 located opposite to a photosensitive surface 3.

Figure 13:
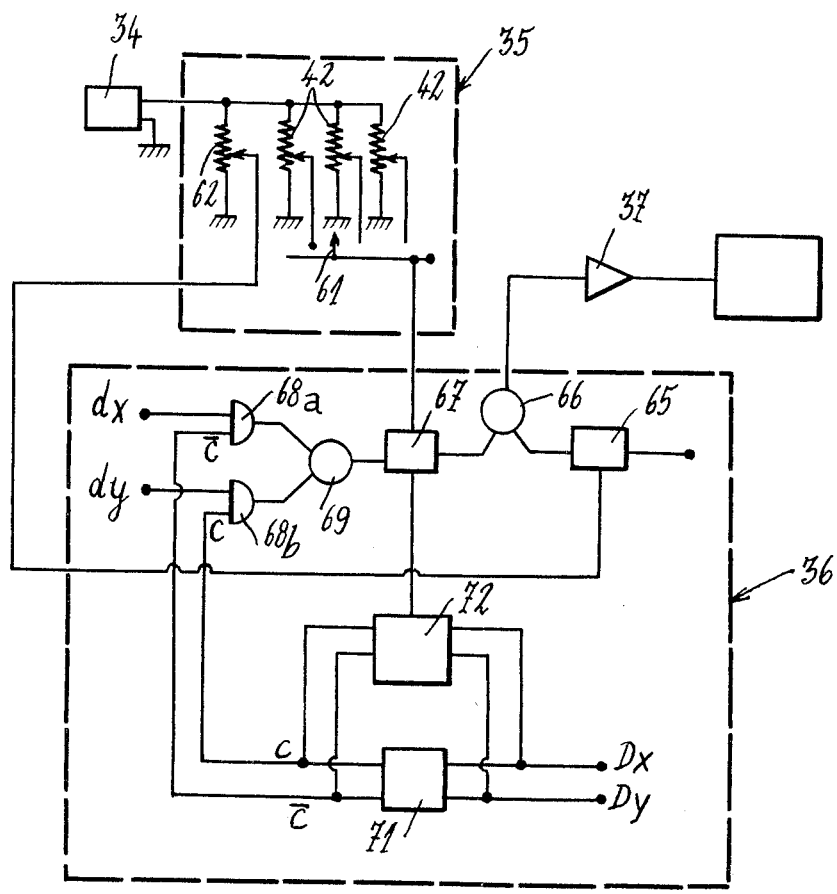
FIG. 13 is a diagram of the generator shown in FIG. 3 in the case of the embodiments in FIGS. 11 and 12.

Referring now to FIG. 13, the device 26 is wholly similar to that shown in FIG. 6 but essentially differs from this latter in the fact that the signal collected at the output of the potentiometers 42 is applied together with the signal derived from the computer 72 to the monostable circuit 67 in order to adjust the time-delay, and also in the fact that the output of the OR-gate 66 is connected directly to the input of the amplifier 37. In addition, the gate 64 has been dispensed with.

During operation, the acousto-optical transducer 25 is controlled by the device 26 so as to modulate light pulses of controlled duration from the continuously-excited generator 81 and has the advantage of positive and practically total extinction.

The operation of the control device 26 is immediately apparent from the foregoing description. In the printing of separate pellets, a signal derived from the potentiometer 62 is applied to the monostable circuit 65 as in the case of FIG. 6. In the tracing of a line, the frequency of the light pulses depends as in the case of FIG. 6 on the largest component, namely $dx$ or $dy$, of the unitary relative displacement of the projector. But in this case the amplitude of the pulses is constant since the output signal of the gate 66 is applied directly to the amplifier 37. The duration of the pulses as defined by the time-delay of the monostable circuit 67 takes into account both the width of the line resulting from the signal derived from the potentiometers 42 and the angular deviation resulting from the signal derived from the computer 72.

The coherent light beam 82 then passes through the optical system 83 and finally prints a spot on the photosensitive surface 3.

If the disc 85 is withdrawn, the light remains coherent up to the point of impact on the surface 3 and may give rise to interferences, the effect of which is to produce an image having a granular appearance and a contour which lacks sharpness of definition. This disadvantage does not appear in the tracing of continuous lines since the superposition of successive spots causes the above-mentioned irregularities to disappear as a result of integration.

In the case of tracing of a separate spot, the rotary translucent disc 85 is interposed on the path of the laser beam, which has the effect of suppressing at least to a partial extent the spatial coherence of said beam and of preventing the above-mentioned interference phenomena.

In all cases, the resultant effect of contrast is excellent by reason of the quality of extinction produced by the transducer 25 on the laser beam 82.

Figure 12:
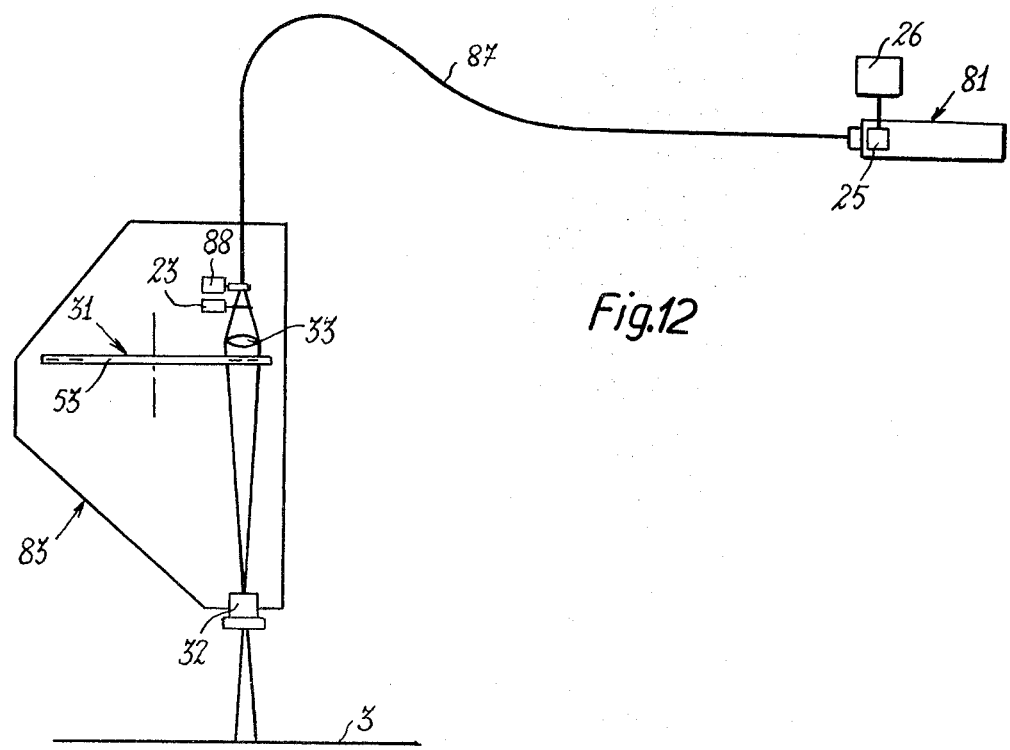
FIG. 12 is a diagrammatic view of a third embodiment of a projector in accordance with the invention and also comprising a laser beam generator.

The embodiment which is illustrated in FIG. 12 differs from the preceding in that the beam emitted by the laser generator 81 is guided by an optical fiber 87 and this has the effect of eliminating the radiation by diffusion into the atmosphere.

A further consequence of this particular arrangement is that it permits appreciable simplification of the optical system 83 which essentially comprises only the manual shutter 23, the convergent lens 33, the object-holder 31 and the object-lens 32. The decoherer disc 85 of the preceding embodiment is replaced in this case by a vibrator 88 which imparts movement to the downstream end of the optical fiber 87. The vibrator 88 can be of any known type such as an electromagnetic vibrator.

The operation is similar to that of the embodiment shown in FIG. 11. The mixture of elementary fibers of the optical fiber 87 produces a divergent beam at the output of said fiber and this avoids the need to make use of a divergent lens system. In the case of tracing of separate spots, the vibrator 88 is put into operation in order to prevent any interference phenomena.

A further advantage of the last embodiment described in the foregoing is to permit the installation of the laser generator 81 in a fixed location without making it necessary for this latter to follow the displacements of the optical system 83; this device which is relatively delicate and costly can thus be treated with due care. In the embodiment which is illustrated in FIG. 11, the generator 81 is not required to follow the displacements of the optical system 83 in a direction parallel to the beam 82.

In all cases, the embodiments described make it possible to obtain photographic images which offer a high degree of contrast irrespective of the frequency of the modulated light pulses.

It should be clearly understood that the invention is not limited to the embodiment which has just been described and that a large number of alternative modes of execution of this latter may accordingly be contemplated without thereby departing either from the scope or the spirit of the invention. Thus the control signals of the electro-optical transducer can be formed by pulses of controllable duration instead of successive wave trains. Many alternative forms of construction of the optical system may also be devised.

I claim:

1. A method whereby continuous lines having substantially parallel edges and a substantially constant exposure at any point of the line irrespective of the width of said line are traced automatically by successive spots applied at high frequency on a photosensitive surface, said exposure being the product of the luminous intensity received at one point and of the total time of exposure of said point, comprising projecting light pulses from a projector moving in a direction parallel to the sensitive surface aforesaid, controlling the duration, frequency and amplitude of said light pulses at each instant in response to the unitary relative displacement of the projector with reference to a predetermined value of said displacement and to the width of the line in order that the successive images of the spot corresponding to said pulses should overlap to a sufficient extent to ensure that the resultant image is that of a line which has substantially rectilineal edges and is the envelope of the images of the spot and in order that the exposure aforesaid should be substantially constant over the entire length of the line and over all the lines traced regardless of the respective widths of said lines.

2. A method according to claim 1, wherein the amplitude of the modulated light pulses is inversely proportional to the width of the line and wherein the frequency of said pulses is proportional to the greater of two cartesian components of the unitary relative displacement of the projector, and wherein the duration of said pulses is inversely proportional to the cosine of the angle between the real relative displacement of the projector and the cartesian component aforesaid.

3. A method according to claim 1, wherein the amplitude of the light pulses aforesaid is constant, wherein the frequency of said pulses is proportional to the greater of the two cartesian components of the unitary relative displacement of the projector, and wherein the duration of said pulses is inversely proportional both to the cosine of the angle between the real relative displacement of the projector and the cartesian component aforesaid and to the width of the line.

4. A light projector for a photographic tracing machine which is primarily intended to carry out the automatic tracing of conductive strips of printed circuits said machine being provided with a device for causing the continuous movement of the projector in a direction parallel to a plane on which a photosensitive surface is applied and the projector comprises an object-holder, a light source for illuminating an object in the form of a spot of predetermined shape mounted in said object-holder, an optical system for forming the image of said spot on the photosensitive surface and an optical transducer for modulating at high frequency the luminous intensity received by the objectspot, wherein said projector comprises:

a. a generator for producing successive trigger signals;

b. means for causing said signals to initiate a corresponding sequence of light pulses which are applied to the object-spot;

c. and means for initiating the application of the trigger signals aforesaid as a function of the unitary relative displacements of the projector in such a manner as to ensure that two successive images of the spot which are thus obtained overlap over the greater part of their surfaces.

5. A projector according to claim 4, wherein the means hereinabove contemplated in section (c) comprise:
   d. means for initiating a trigger signal each time the component of the relative displacement of the projector in a reference direction attains a predetermined unitary value;
   e. and means for varying the duration of each signal as a function of the angle between the relative displacement of the projector and said reference direction.

6. A projector according to claim 5, wherein said projector comprises means for comparing the components of the relative displacement of the projector along two rectangular axes and for selecting as a reference direction one of said two axes which corresponds to the components of displacement of higher value.

7. A projector according to claim 6, wherein:
   the trigger signal generator hereinabove contemplated in section (a) comprises a periodic signal generator;
   the means hereinabove contemplated in section (d) and the means contemplated in section (e) comprise a variable-delay monostable device in which the trigger circuit is controlled by the relative displacement of the projector in the reference direction;
   the means contemplated in section (e) comprise a control circuit for the time-delay of the monostable device, which is controlled by the angle between the direction of relative displacement of the projector and the reference direction.

8. A projector according to claim 7 for the practical application of a method according to claim 2, wherein said projector comprises means for varying the amplitude of the light pulses in inverse ratio to the diameter of the spot.

9. A projector according to claim 8, wherein the means hereinabove contemplated in section (b) comprise an AND-gate which connects the signal generator contemplated in section (a) to the optical transducer and the aforementioned monostable device controls the opening of said gate.

10. A projector according to claim 9, wherein the trigger signals hereinabove contemplated in section (a) are electrical wave trains.

11. A projector according to claim 10, wherein the optical transducer is of the electro-optical type and comprises a controllable birefringence plate disposed between a polarizer and an analyzer in crossed relation, the birefringence of the plate being controlled by the trigger signals aforesaid.

12. A projector according to claim 7 for the practical application of a method according to claim 3, wherein the light source is a laser beam generator and wherein the optical transducer is of the acousto-optical type.

13. A projector according to claim 12, wherein the acousto-optical transducer is located between the mirrors of the generator aforesaid.

14. A projector according to claim 13, wherein the means hereinabove contemplated in section (e) are additionally intended to respond as a function of the width of the line.

15. A projector according to claim 14, wherein the time-delay of the monostable device is additionally controlled as a function of the width of the line.

16. A projector according to claim 15, wherein said projector comprises means for suppressing at least to a partial extent the spatial coherence of the laser beam.

17. A projector according to claim 16, wherein the aforementioned means for decohering the laser beam comprise a rotary translucent disc disposed transversely on the path of said beam.

18. A projector according to claim 15, wherein the optical system comprises an optical fiber for guiding the laser beam.

19. A projector according to claim 18 and comprising means for suppressing at least to a partial extent the spatial coherence of the laser beam, wherein said means comprise a vibrator adapted to impart motion to the downstream end of the optical fiber aforesaid.

* * * * *

UNITED STATES PATENT OFFICE
CERTIFICATE OF CORRECTION

PATENT NO. : 3,903,527
DATED : September 2, 1975
INVENTOR(S) : Andre FREHLING

It is certified that error appears in the above-identified patent and that said Letters Patent are hereby corrected as shown below:

In Item [30], "Foreign Application Priority Data", insert

--Jan. 29, 1974   France...................74.02866--

Signed and Sealed this sixteenth Day of December 1975

[SEAL]

Attest:

RUTH C. MASON
*Attesting Officer*

C. MARSHALL DANN
*Commissioner of Patents and Trademarks*